United States Patent
Sugiura (10) Patent No.: US 11,115,634 B2
(45) Date of Patent: Sep. 7, 2021

(54) PROJECTION IMAGE ADJUSTMENT SYSTEM AND PROJECTION IMAGE ADJUSTMENT METHOD

(71) Applicant: Panasonic Intellectual Property Management Co., Ltd., Osaka (JP)

(72) Inventor: Yoshinao Sugiura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 27 days.

(21) Appl. No.: 16/825,410

(22) Filed: Mar. 20, 2020

(65) Prior Publication Data

US 2020/0314400 A1 Oct. 1, 2020

(30) Foreign Application Priority Data

Mar. 27, 2019 (JP) .............................. JP2019-061669

(51) Int. Cl.
*H04N 9/31* (2006.01)

(52) U.S. Cl.
CPC ......... *H04N 9/3185* (2013.01); *H04N 9/3182* (2013.01); *H04N 9/3194* (2013.01)

(58) Field of Classification Search
None
See application file for complete search history.

(56) References Cited

U.S. PATENT DOCUMENTS

| | | | |
|---|---|---|---|
| 5,495,348 A | 2/1996 | Sakai et al. | |
| 5,748,797 A | 5/1998 | Sakai et al. | |
| 5,870,531 A | 2/1999 | Sakai et al. | |
| 2012/0013634 A1 | 1/2012 | Haraguchi et al. | |
| 2013/0057707 A1* | 3/2013 | Hasegawa | G06T 7/136 |
| | | | 348/189 |

FOREIGN PATENT DOCUMENTS

| | | |
|---|---|---|
| JP | 3-272271 | 12/1991 |
| JP | 8-219721 | 8/1996 |
| JP | 2007-194865 | 8/2007 |
| JP | 2009-194420 | 8/2009 |
| JP | 2012-22246 | 2/2012 |

* cited by examiner

*Primary Examiner* — Michelle M Iacoletti
*Assistant Examiner* — Danell L Owens
(74) *Attorney, Agent, or Firm* — Wenderoth, Lind & Ponack, L.L.P.

(57) ABSTRACT

A projection image adjustment system includes: a pattern generator decomposes a projection test pattern into binary test patterns individually corresponding to first attributes to be expressed in a binary manner; a projection display apparatus projects a projection image and the binary test patterns; a pattern combining unit generates binary captured images by individually binarizing captured images generated by capturing the projected binary test patterns and combines the binary captured images into a combined captured image; and a calculator transforms the projection image by using a relationship between positions of feature points in the combined captured image and positions of the feature points in the projection test pattern. The projection test pattern includes divided regions, each of the regions includes a second attribute to be expressed by a combination of the first attributes, and each of the feature points is a point shared three or more adjacent regions among the regions.

6 Claims, 11 Drawing Sheets

| Color | R channel | G channel | B channel |
|---|---|---|---|
| Red | 1 | 0 | 0 |
| Green | 0 | 1 | 0 |
| Yellow | 1 | 1 | 0 |
| Blue | 0 | 0 | 1 |
| Magenta | 1 | 0 | 1 |
| Cyan | 0 | 1 | 1 |
| White | 1 | 1 | 1 |

| 600A Color | Channel C1 | Channel C2 | Channel C3 | ... | Channel Cn |
|---|---|---|---|---|---|
| Color 1 | 1 | 0 | 0 | ⋮ | 0 |
| Color 2 | 0 | 1 | 0 | ⋮ | 0 |
| Color 3 | 1 | 1 | 0 | ⋮ | 0 |
| Color 4 | 0 | 0 | 1 | ⋮ | 0 |
| Color 5 | 1 | 0 | 1 | ⋮ | 0 |
| Color 6 | 0 | 1 | 1 | ⋮ | 0 |
| .. | .. | .. | .. | ⋮ | .. |
| Color $2^n$-1 | 1 | 1 | 1 | ⋮ | 1 |

PROJECTION IMAGE ADJUSTMENT SYSTEM AND PROJECTION IMAGE ADJUSTMENT METHOD

BACKGROUND

1. Technical Field

The present disclosure relates to a projection image adjustment system and a projection image adjustment method for adjusting a projection image of a projection display apparatus.

2. Description of the Related Art

PTL (Patent Literature) 1 discloses a projection display apparatus that, even in a case where a whole of a test pattern image cannot be captured by an imaging device and a number of feature points is large, makes it possible to easily detect the respective feature points. In this test pattern image, each of the feature points is defined as a point at which at least three regions are adjacent to one another, and the feature points are specified by combinations of arrangements of such adjacent regions.

Moreover, there is also widely known a method of projecting and capturing a plurality of black and white stripe patterns represented by gray code patterns, and specifying feature points according to an appearance order of black and white.

PTL 1 is Unexamined Japanese Patent Publication No. 2012-22246.

SUMMARY

In the test pattern image disclosed in PTL 1, the plurality of adjacent regions have features such as brightness, saturation and hue. However, there is a possibility that it will become difficult to obtain a difference in brightness, saturation or hue between the adjacent regions from a captured image depending on a condition such as a pattern and color of a projection surface and an influence of external light, resulting in that the feature points cannot be specified correctly.

Meanwhile, in the gray code patterns, it is possible to perform a highly accurate binary determination from a captured image. However, in order to acquire a large number of feature points, it is necessary to prepare a larger number of projection test pattern images than in PTL 1. Since it takes time to display and capture the test pattern images, it is preferable that a number of required projection test patterns be as small as possible.

In view of the problems as described above, the present disclosure provides a projection image adjustment system and a projection image adjustment method, which adjust a video of a projection display apparatus so as to be free from distortion without being affected by the pattern and color of the projection surface, the influence of external light, and the like, and by a smaller number of the test pattern images than in the related art.

A projection image adjustment system of the present disclosure includes: a pattern generator configured to decompose a projection test pattern into a plurality of binary test patterns individually corresponding to a plurality of first attributes to be expressed in a binary manner; a projection display apparatus configured to individually project a projection image and the plurality of binary test patterns; a pattern combining unit configured to generate a plurality of binary captured images by individually binarizing a plurality of captured images generated by individually capturing the plurality of projected binary test patterns and combine the plurality of binary captured images into a combined captured image; and a calculator configured to transform the projection image by using a relationship between positions of a plurality of feature points in the combined captured image and positions of the plurality of feature points in the projection test pattern. Moreover, a projection image adjustment method of the present disclosure includes: decomposing a projection test pattern into a plurality of binary test patterns individually corresponding to a plurality of first attributes to be expressed in a binary manner; individually projecting a projection image and the plurality of binary test patterns; generating a plurality of binary captured images by individually binarizing a plurality of captured images generated by individually capturing the plurality of projected binary test patterns and combining the plurality of binary captured images into a combined captured image; and transforming the projection image by using a relationship between positions of a plurality of feature points in the combined captured image and positions of the plurality of feature points in the projection test pattern. Here, the projection test pattern includes a plurality of divided regions, each of the plurality of regions includes a second attribute to be expressed by a combination of the plurality of first attributes, and each of the plurality of feature points is a point shared by three or more adjacent regions among the plurality of regions.

In accordance with the projection image adjustment system and the projection image adjustment method according to the present disclosure, it becomes possible to adjust the video of the projection display apparatus so as to be free from distortion without being affected by the pattern and color of the projection surface, the influence of external light, and the like, and by a smaller number of the test pattern images than in the related art.

DETAILED DESCRIPTION

Exemplary embodiments will be described in detail below with reference to the accompanying drawings as appropriate. However, an unnecessarily detailed description may be omitted. For example, a detailed description of well-known matters or a duplicate description of substantially the same configuration may be omitted. This is to avoid unnecessary redundancy of the following description and to facilitate understanding by those skilled in the art.

Note that the inventor provides the accompanying drawings and the description below to help those skilled in the art to fully understand the present disclosure, and does not intend to use the accompanying drawings or the description below to limit the subject matter described in the claims.

First Exemplary Embodiment

A first exemplary embodiment will now be described below with reference to FIGS. 1 to 6.

1. Configuration

Figure 1:
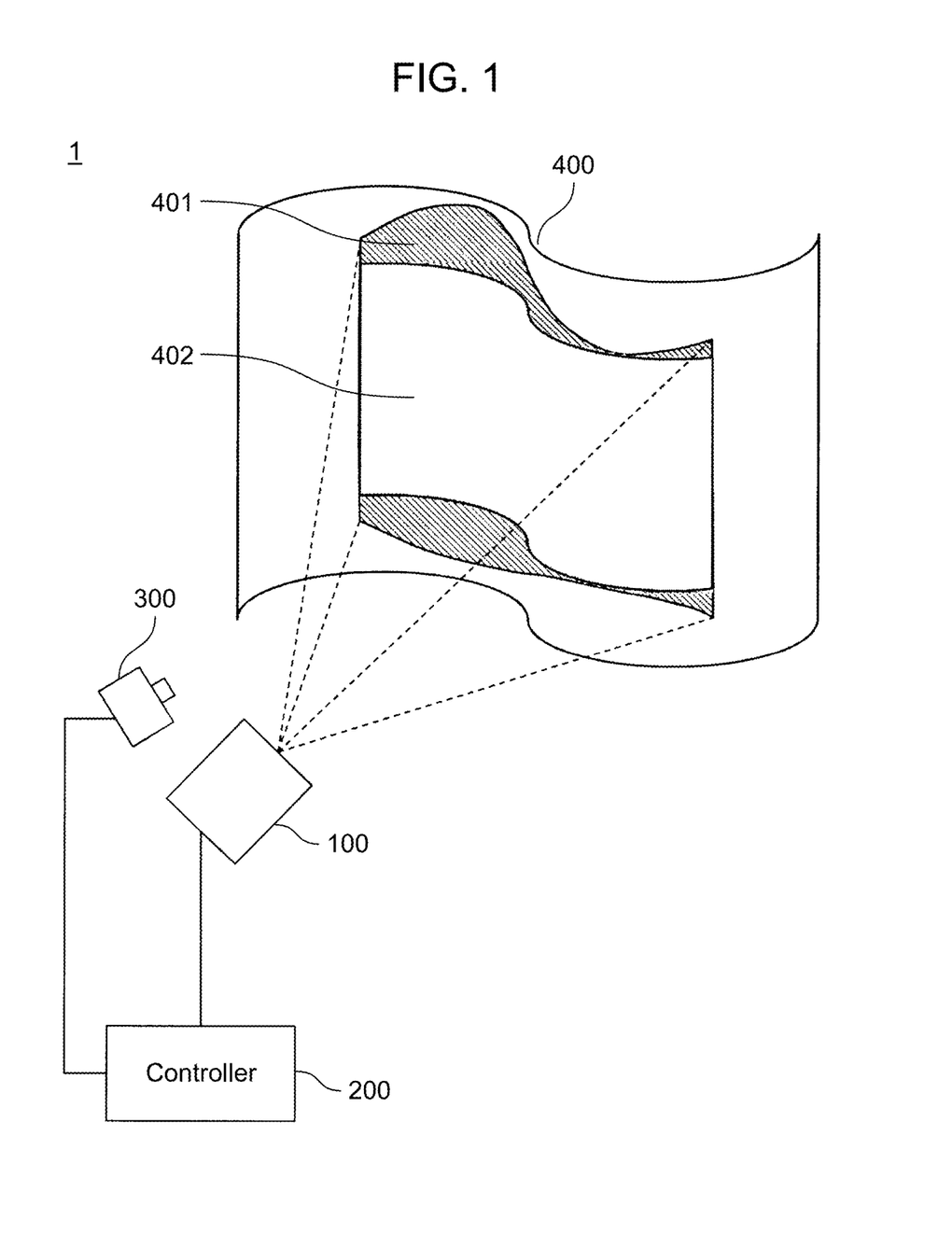
FIG. 1 is a schematic view illustrating an outer appearance example of projection image adjustment system 1 according to a first exemplary embodiment.

FIG. 1 is a schematic view illustrating an outer appearance example of projection image adjustment system 1 according to a first exemplary embodiment. In FIG. 1, projection image adjustment system 1 includes projection display apparatus 100, controller 200, imaging device 300, and projection surface 400.

In FIG. 1, projection display apparatus 100 projects projection video 401 onto projection surface 400 in accordance with an image signal coming from controller 200. Projection surface 400 is not a completely flat surface, whereby projection video 401 is distorted. Imaging device 300 is an imaging device, for example, such as a camera. Imaging device 300 captures a region including projection video 401 in response to an image capture instruction signal coming from controller 200, and transmits a captured image signal to controller 200.

Controller 200 is a control device, for example, such as a personal computer (PC), and is communicably connected to projection display apparatus 100 and imaging device 300. Projection image adjustment system 1 adjusts a video (image signal) to be projected by an operation to be described later, and displays projection video 402 adjusted to be free from distortion. Here, "free from distortion" refers to that an original image to be displayed and a displayed projection image become substantially the same.

Figure 2:
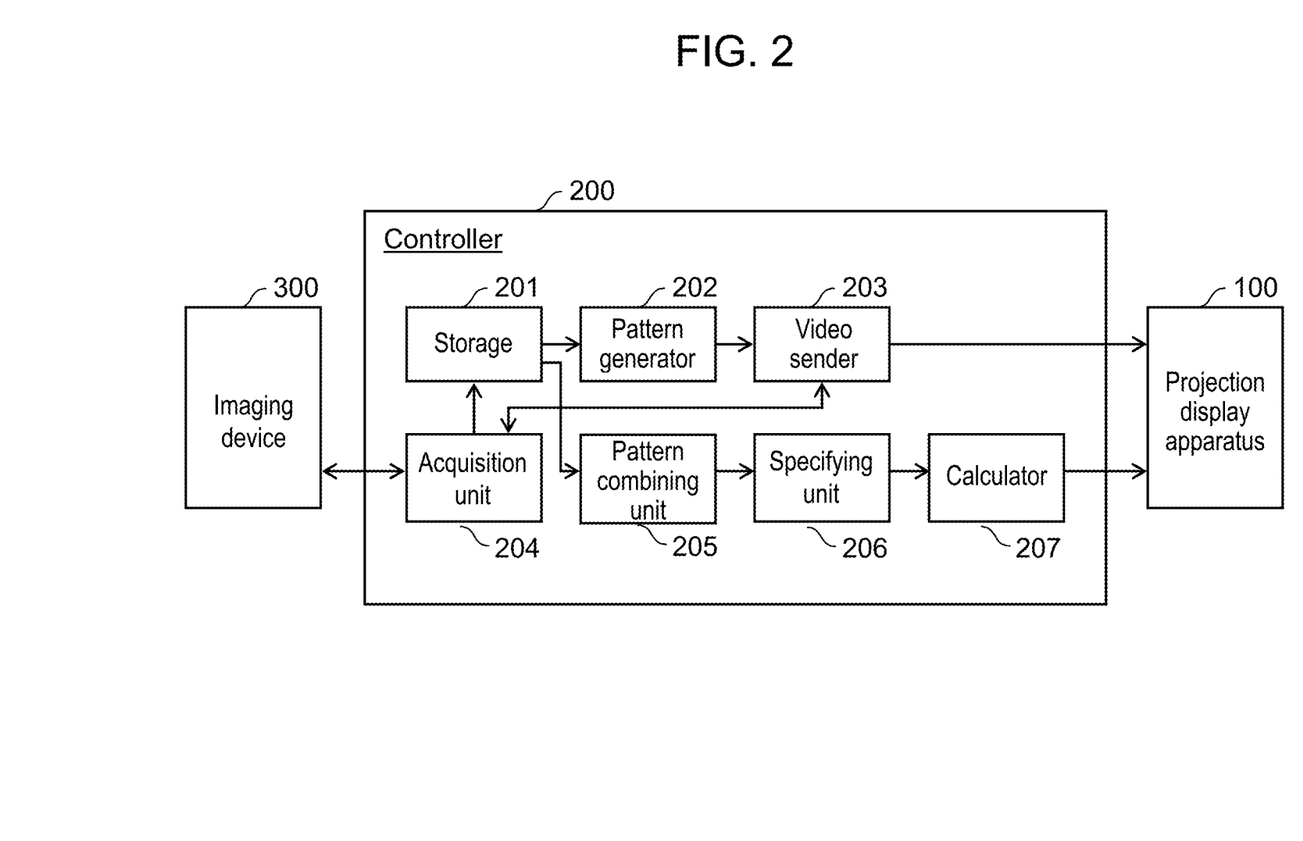
FIG. 2 is a block diagram illustrating a detailed configuration example of controller 200 of FIG. 1.

FIG. 2 is a block diagram illustrating a detailed configuration example of controller 200 of FIG. 1. In FIG. 2, storage 201 is a storage device such as a magnetic hard disk drive. Storage 201 stores data necessary for adjustment processing, the data including projection test pattern 500 (see FIG. 3), captured images 701 to 703 (see FIG. 6) input from imaging device 300 via acquisition unit 204, and the like.

Figure 5:
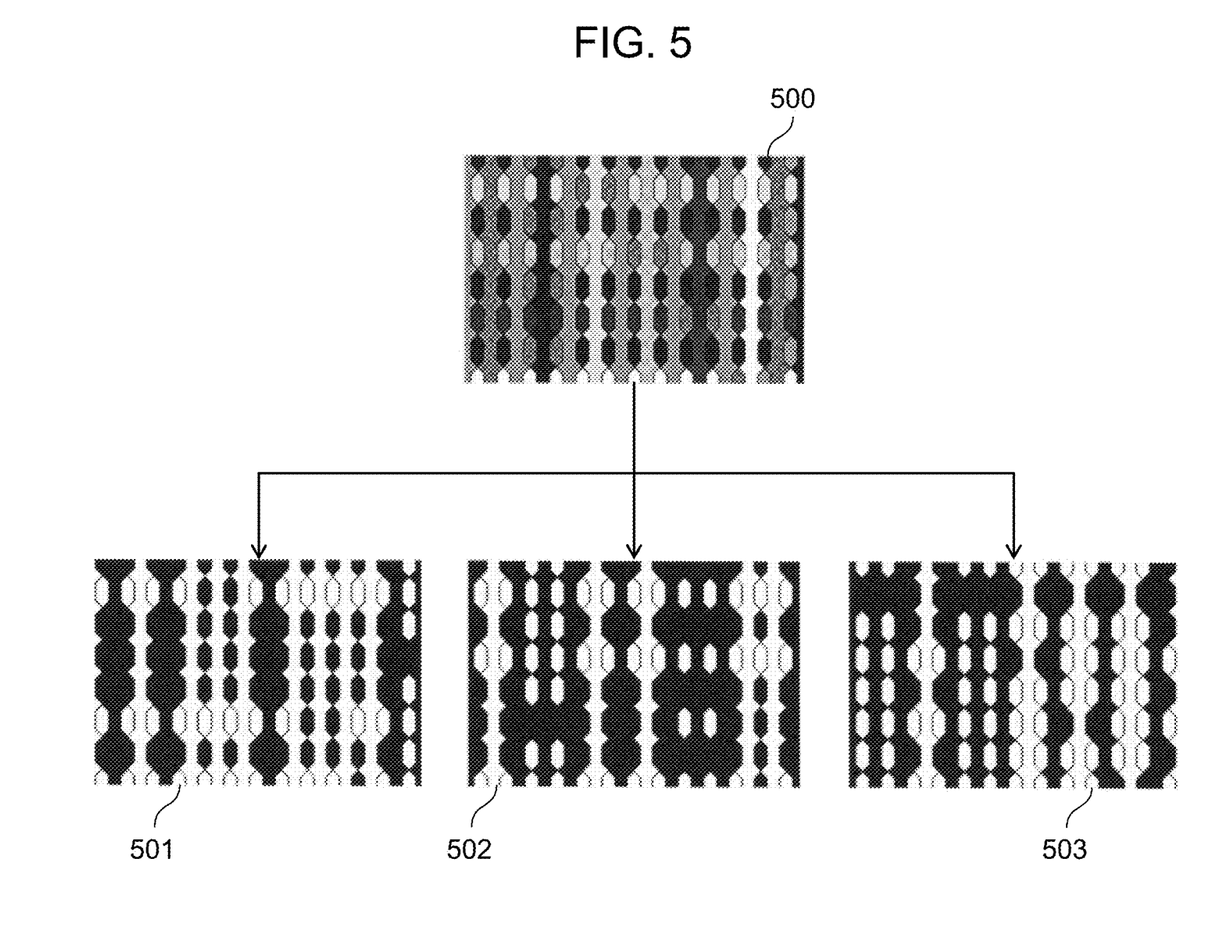
FIG. 5 is a view illustrating an operation example of binary test pattern generation processing in projection image adjustment system 1 of FIG. 1.

In FIG. 2, pattern generator 202 decomposes projection test pattern 500 to respective channels of R, G and B, and generates three binary test patterns 501 to 503 (see FIG. 5). Then, pattern generator 202 outputs binary test patterns 501 to 503 to projection display apparatus 100 via video sender 203, and causes projection display apparatus 100 to display binary test patterns 501 to 503.

Acquisition unit 204 transmits an image capture instruction signal, which issues an instruction to capture projection surface 400, to imaging device 300 in response to a video output signal of video sender 203. Imaging device 300 captures binary test patterns 501 to 503, which are projected onto projection surface 400, in response to the image capture instruction signal, and transmits captured images 701 to 703 to acquisition unit 204. Acquisition unit 204 causes storage 201 to store acquired captured images 701 to 703. Pattern combining unit 205 individually binarizes three captured images 701 to 703 stored in storage 201, combines these as binary images of the respective channels of R, G and B, and obtains combined captured image 700 (see FIG. 6).

Specifying unit 206 specifies coordinates corresponding to respective feature points P of projection test pattern 500 in obtained combined captured image 700, and obtains a relationship between positions of feature points P of projection test pattern 500 and coordinates of the respective feature points in combined captured image 700. On the basis of this correspondence relationship, calculator 207 calculates transformation data for transforming projection video 401 into projection video 402 having a shape free from distortion, and outputs the transformation data to projection display apparatus 100. Projection display apparatus 100 adjusts a video, which is to be projected, on the basis of the transformation data, and displays projection video 402 adjusted so as to be free from distortion.

Figure 3:
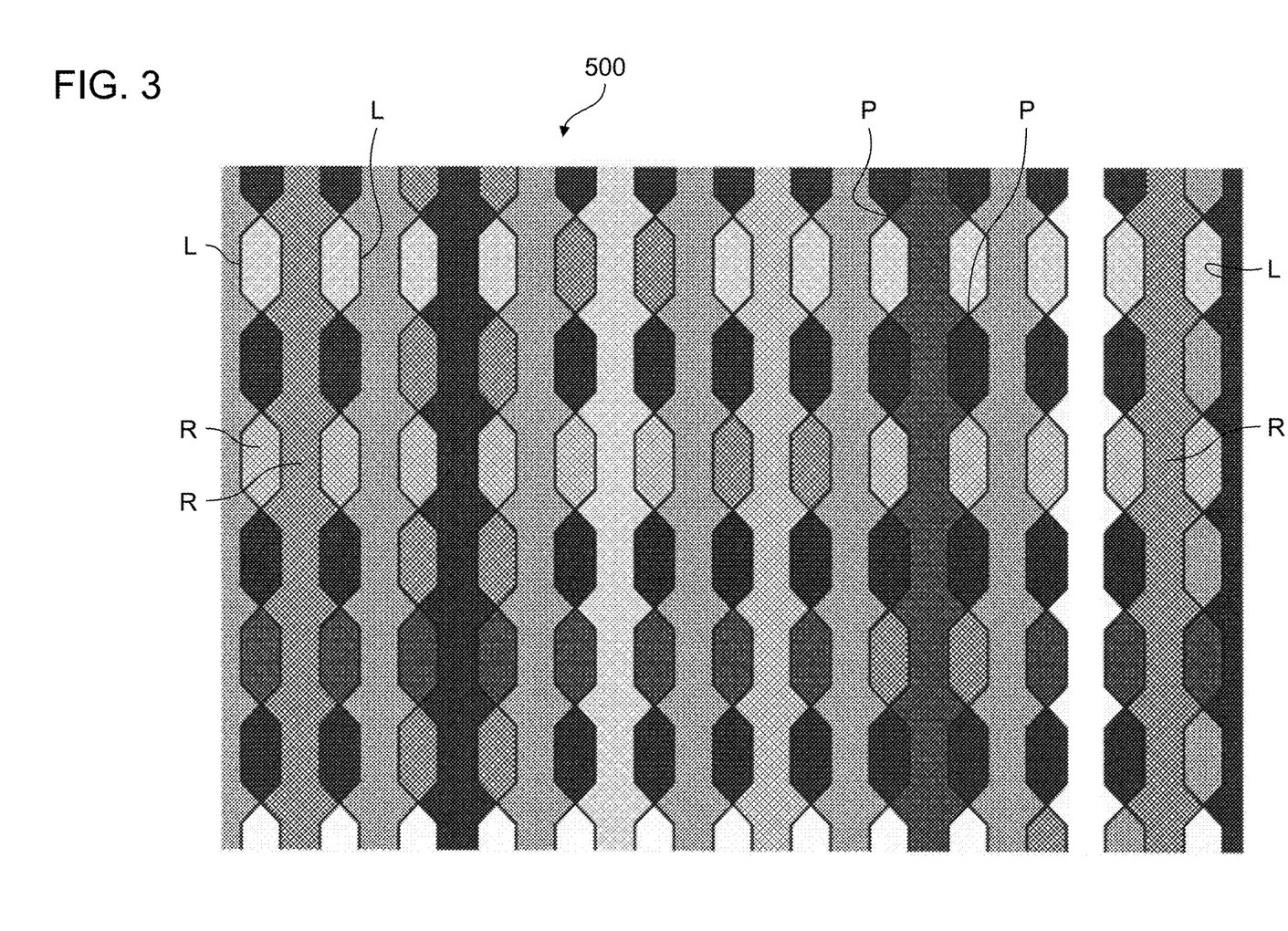
FIG. 3 is a view illustrating an example of projection test pattern 500 in projection image adjustment system 1 of FIG. 1.

FIG. 3 is a view illustrating an example of projection test pattern 500 in projection image adjustment system 1 of FIG. 1. In FIG. 3, projection test pattern 500 is image data divided into a plurality of regions R, in which each of the plurality of regions R has any color among seven colors (red, blue, green, cyan, magenta, yellow, white) (see FIG. 4). In projection test pattern 500, a line in which two regions R are side-adjacent to each other is represented by boundary line L, and a point in which four regions R are point-adjacent to one another is represented by feature point P. Here, "side-adjacent" refers to that two regions R share same boundary line L as a side, and "point-adjacent" refers to that three or more regions R share same feature point P as a vertex.

Hereinafter, when "combination of colors" is mentioned regarding four regions R point-adjacent to one another at feature point P, even if regions R of the same four colors are point-adjacent to one another at two feature points P, if a permutation of regions R differs, or if regions R are rotated, then such a case is treated as another combination. For example, in each of two feature points P illustrated in FIG. 3, four regions R are point-adjacent to one another in order of blue, magenta, yellow and red clockwise; however, combinations of the colors at two feature points P are in a relationship of being rotated relatively to each other by 180 degrees. Accordingly, the combinations of the colors at two feature points p are different from each other.

In projection test pattern 500, all feature points P in each of which four regions R are point-adjacent to one another have such color combinations different from one another. Hence, when four regions R are point-adjacent to one another at certain feature point P, which of all feature points P that certain feature point P is can be determined uniquely. A correspondence relationship between respective feature points P and the color combinations and the coordinates is stored as a database in storage 201.

Figure 4:
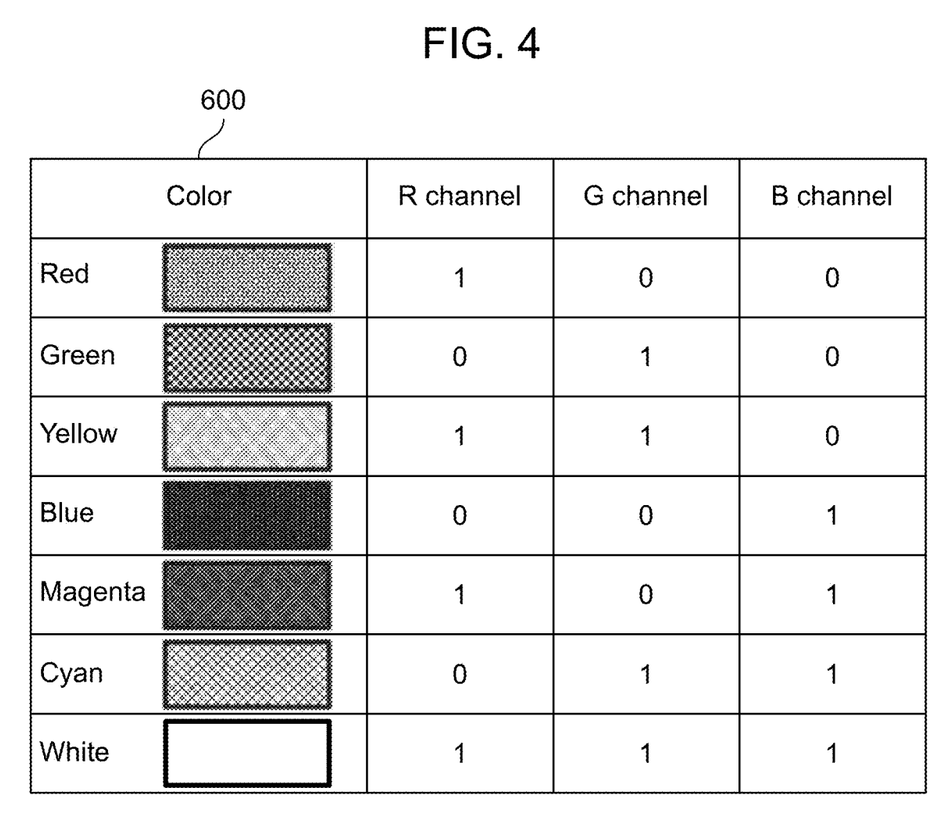
FIG. 4 is a table illustrating a data configuration example of color channel database 600 stored in storage 201 of FIG. 2.

FIG. 4 is a table diagram illustrating color channel database 600 stored in storage 201 of FIG. 2. In FIG. 4, color channel database 600 is stored, for example, in storage 201. Color channel database 600 is a database indicating a correspondence relationship between the colors of regions R in projection test pattern 500 and ON/OFF in the respective channels of R, G and B. In FIG. 4, color channel database 600 indicates a correspondence relationship as to whether the respective channels of R, G and B are ON (1) or OFF (0) for the seven colors of pixels. For example, color channel database 600 indicates that the color of magenta and a state in which the R channel and the B channel are 1 and the G channel is 0 correspond to each other. The channels of R, G and B are examples of first attributes, and the seven colors of pixels are examples of second attributes.

2. Operations

Operations of projection image adjustment system 1 configured as described above will be described below.

First, pattern generator 202 decomposes the projection test pattern, which is stored in storage 201, into the respective channels of R, G and B, and generates three binary test patterns 501 to 503 to be actually projected by the projection display apparatus. Detailed operations of generation processing for the binary test patterns will be described below.

FIG. 5 is a view illustrating an operation example of such binary test pattern generation processing in projection image adjustment system 1 of FIG. 1. In FIG. 5, pattern generator 202 generates three binary test patterns 501 to 503 on the basis of projection test pattern 500 and color channel database 600. Specifically, pattern generator 202 generates binary test pattern 501 of the R channel, which is a binary image formed by converting each pixel of projection test pattern 500 into a value (0 or 1) of the R channel of the pixel. That is, binary test pattern 501 of the R channel is such a binary image in which, in projection test pattern 500, pixels each having a color of red, yellow, magenta or white are white (1), and all other pixels are black (0). Likewise, binary test patterns 502, 503 of the G channel and the B channel are also generated.

In FIG. 5, pattern generator 202 outputs generated binary test patterns 501 to 503 to video sender 203. In response to input of binary test patterns 501 to 503, video sender 203 sequentially outputs image signals, which indicate binary test patterns 501 to 503, to projection display apparatus 100. Thus, the three binary test patterns are sequentially projected onto projection surface 400. Moreover, at the same time of outputting binary test pattern 501 of the R channel, video sender 203 transmits a red video output signal, which indicates that video sender 203 is outputting binary test pattern 501 of the R channel, to acquisition unit 204. Likewise, video sender 203 also transmits a green video output signal and a blue video output signal with respect to binary test patterns 502, 503 of the G channel and the B channel, respectively.

In response to the red video output signal output from video sender 203, acquisition unit 204 transmits the image capture instruction signal to imaging device 300. In response to the image capture instruction signal, imaging device 300 captures projection surface 400 onto which binary test pattern 501 of the R channel is projected. Storage 201 stores captured image 701, in which binary test pattern 501 of the R channel is captured, via acquisition unit 204. Controller 200 repeats similar processing also for the green video output signal and the blue video output signal, thereby storing three captured images 701 to 703 in storage 201.

Figure 6:
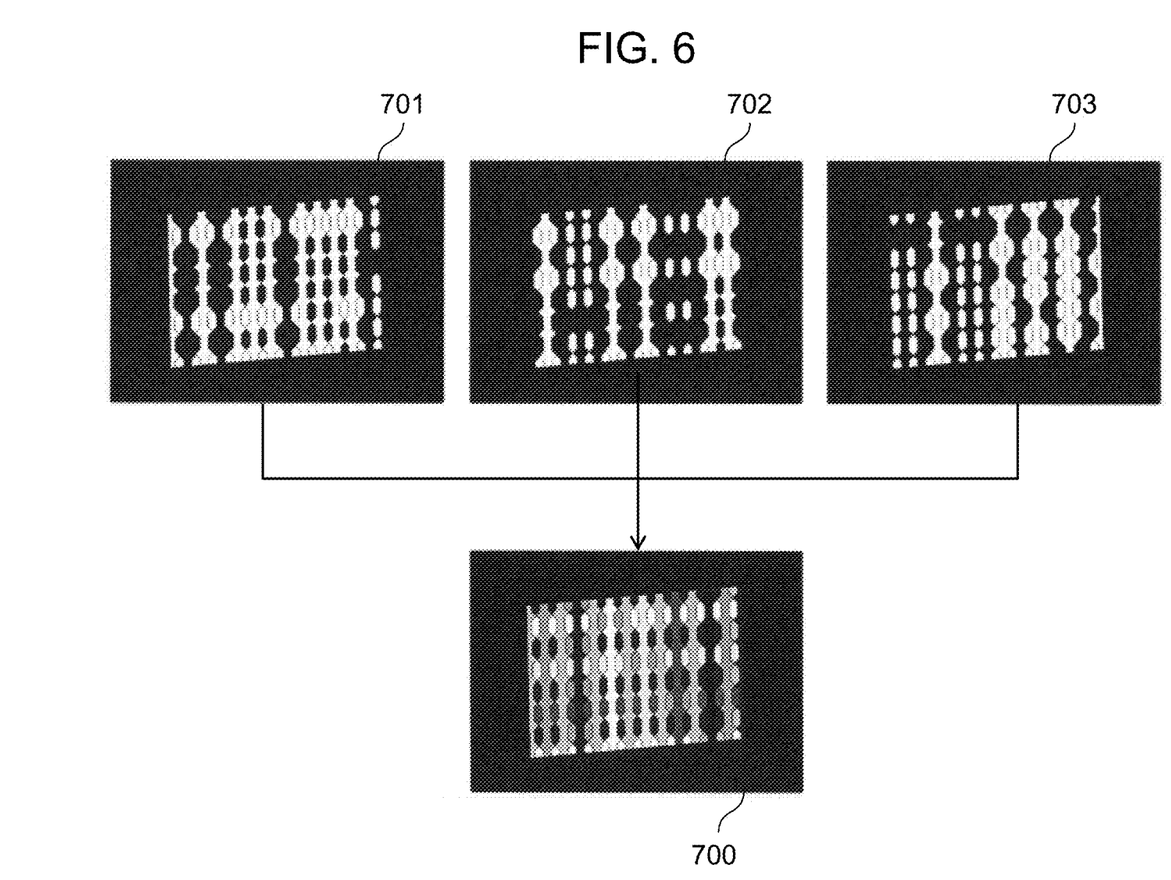
FIG. 6 is a view illustrating an operation example of captured image combining processing in projection image adjustment system 1 of FIG. 1.

FIG. 6 is a view illustrating an operation example of the captured image combining processing in projection image adjustment system 1 of FIG. 1. In FIG. 6, pattern combining unit 205 binarizes three captured images 701 to 703 stored in storage 201, thereafter combines the obtained three binary captured images into combined captured image 700 on the basis of color channel database 600, and outputs combined captured image 700 to specifying unit 206. Combined captured image 700 is such an image in which values of the respective channels corresponding to the colors of the respective pixels are values of pixels corresponding to the three binary captured images. For example, such a pixel, in which the values of the corresponding pixels in the captured binary images of the R channel and the B channel are 1, and the value of the corresponding pixel in the binary captured image of the G channel is 0, is defined as a pixel of magenta.

Here, projection video 401 to be displayed by projection display apparatus 100 and imaged by imaging device 300 is a binary test pattern, and is a binary image of white (1) and black (0). Hence, accurate combined captured image 700 can be obtained without being affected by a pattern and color of projection surface 400, an influence of external light, and the like.

From combined captured image 700 thus input, specifying unit 206 specifies positions of all the feature points in which regions R of four different colors are point-adjacent to one another, and specifies to which feature points P of projection test pattern 500 the respective feature points correspond. Thus, a relationship between pixel coordinates of projection video 401 and pixel coordinates of combined captured image 700 can be obtained. On the basis of the relationship between the pixel coordinates, calculator 207 calculates the transformation data that is a parameter for transforming projection video 401, which is to be projected from projection display apparatus 100, into projection video 402 having a shape free from distortion, and outputs the transformation data to projection display apparatus 100. This transformation is performed, for example, by performing mesh transformation for respective regions R of projection video 402 such that each of regions R is displayed with substantially the same shape as corresponding region R of projection test pattern 500.

A number of test pattern images to be displayed and captured in order to specify the positions of the feature points will be described while being compared with that of the case of using the gray code patterns in the related art.

In projection image adjustment system 1, points at which regions R of four colors among seven types of colors are point-adjacent to one another are defined as the feature points. Hence, such feature points distinguishable from one another can be made up to $_7P_4=840$ pieces at the maximum. The number of test pattern images to be displayed and captured in order to specify the positions of these 840 feature points is three that is a number of binary test patterns 501 to 503 for the respective channels.

In contrast, in a projection image adjustment system using the gray code patterns of the related art, it is necessary to display and capture at least $\text{ceil}(\log(840))=10$ (ten) binary test patterns in order to specify the positions of the same 840 feature points. Here, log is a logarithmic function using 2 as a base, and ceil(x) is a ceiling function that returns a minimum integer that is equal to or larger than a real number x. As described above, projection image adjustment system 1 according to the present disclosure can perform the projection image adjustment processing by the test pattern images of which number is smaller than in the case of using the gray code patterns.

3. Effects and the Like

As described above, projection image adjustment system 1 according to the first exemplary embodiment includes pattern generator 202, projection display apparatus 100, pattern combining unit 205, and calculator 207. Pattern generator decomposes projection test pattern 500 into binary test patterns 501 to 503 classified according to the first attributes. Projection display apparatus 100 individually projects the plurality of binary test patterns onto projection surface 400. Pattern combining unit 205 individually captures the plurality of displayed binary test patterns 501 to 503, and combines the combined captured image from the respective binary captured images obtained by binarizing the respective captured images. Calculator 207 transforms the projection image such that the positions of the feature points of the projection image and the positions of the feature points of the projection test pattern coincide with each other.

Thus, projection image adjustment system 1 can adjust the video of projection display apparatus 100 so as to eliminate distortion without being affected by the pattern and color of projection surface 400, the influence of external light, and the like, and by a smaller number of the test pattern images than in the related art.

Note that, though imaging device 300 is provided together with projection display apparatus 100 in the first exemplary embodiment, imaging device 300 may be a device built in projection display apparatus 100. Moreover, projection display apparatus 100, controller 200, and imaging device 300 may be communicably connected to one another by wires or wirelessly. Furthermore, in the first exemplary embodiment, black (0 in all channels) is not included in the colors of regions R of projection test pattern 500; however, black may be included in the colors of regions R.

Second Exemplary Embodiment

A second exemplary embodiment will be described below with reference to FIGS. 7 and 8.

Figure 7:
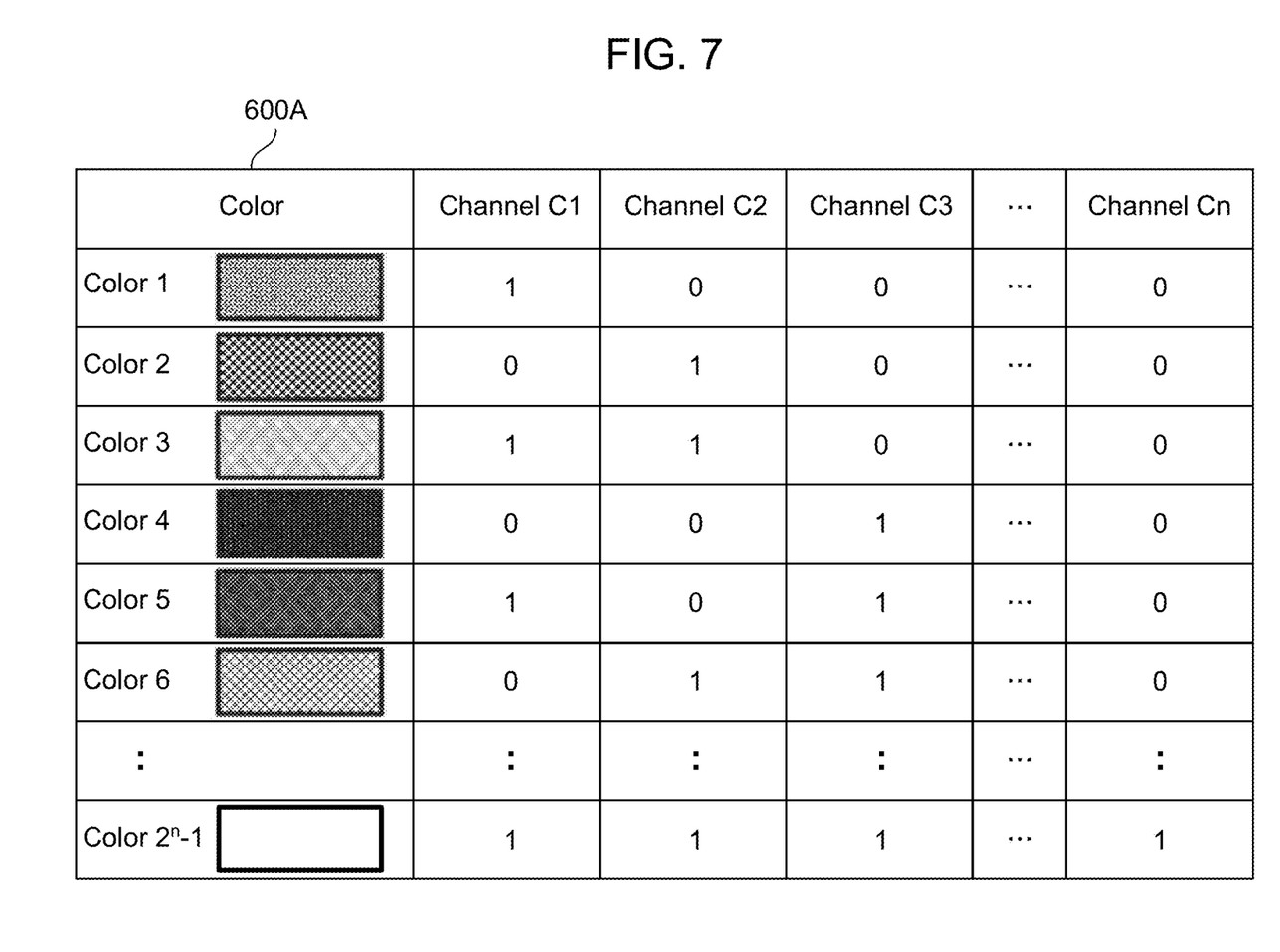
FIG. 7 is a table illustrating a data configuration example of color channel database 600A in projection image adjustment system 1A according to a second exemplary embodiment.

FIG. 7 is a table diagram illustrating color channel database 600A in projection image adjustment system 1A according to the second exemplary embodiment. In the first exemplary embodiment, the attributes (examples of the second attributes) in which regions R have seven types of colors excluding black are set by three channels (examples of the first attributes) of R, G and B. In contrast, in the second exemplary embodiment, n pieces of color channels (examples of the first attributes) of channel C1 to channel Cn are used for four or more natural numbers n. In this case, as illustrated in FIG. 7, colors (examples of the second attributes) which one region R can obtain becomes $2^n-1$ types of colors excluding black as illustrated in FIG. 7.

Figure 8:
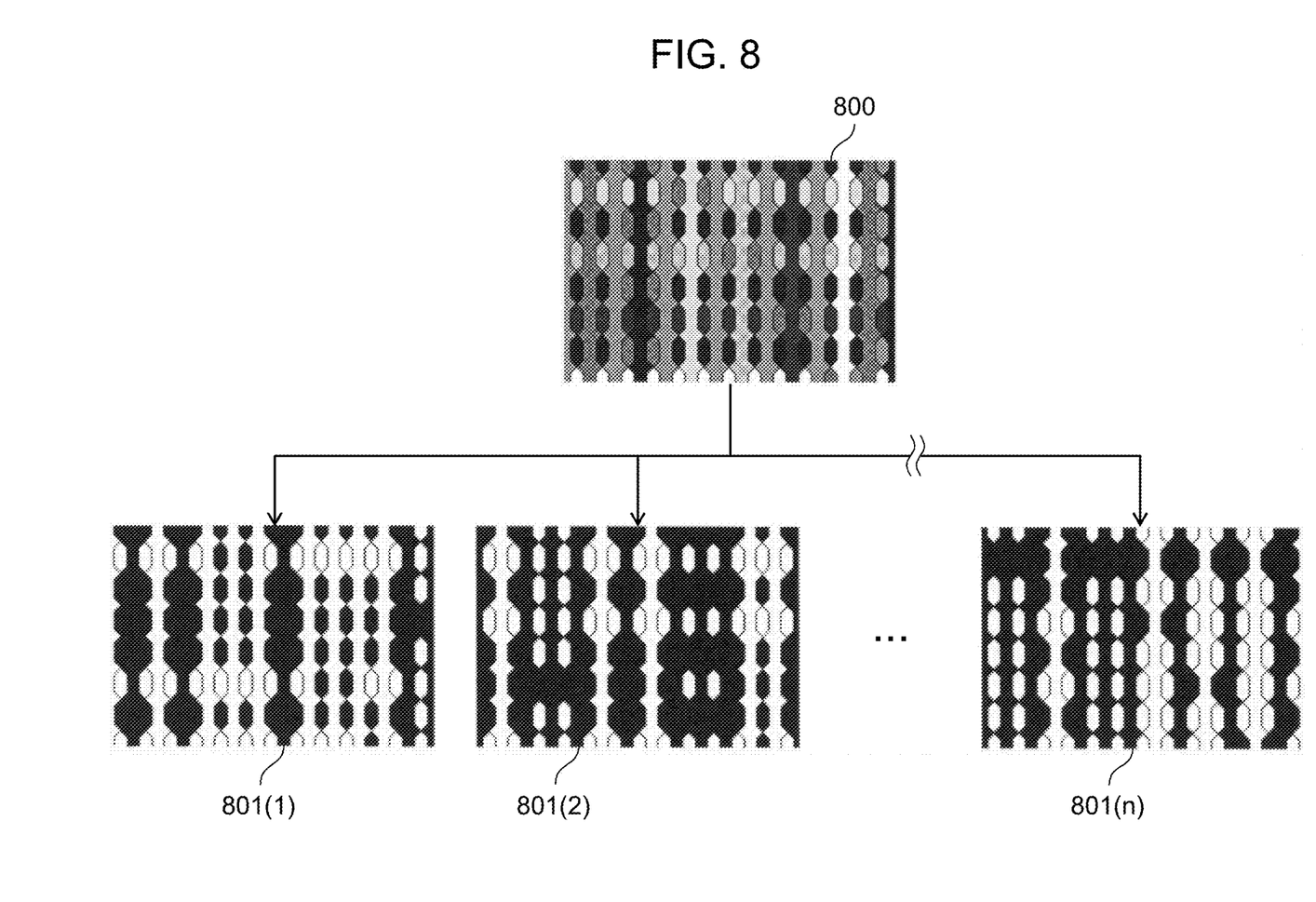
FIG. 8 is a view illustrating an operation example of binary test pattern generation processing in projection image adjustment system 1A of FIG. 7.

FIG. 8 is a view illustrating an operation example of such binary test pattern generation processing in projection image adjustment system 1A of FIG. 7. In the second exemplary embodiment, just as projection test pattern 500 is decomposed into binary test patterns 501 to 503 of three channels in the first exemplary embodiment, projection test pattern 800 is decomposed into binary test patterns 801(1) to 801(n) of channels C1 to Cn. Thereafter, binary test patterns 801(1) to 801(n) are displayed and captured similarly, and n pieces of captured images are combined into combined captured image.

While three channels are used in the first exemplary embodiment, n pieces of channels are used in this exemplary embodiment. Accordingly, attributes which regions R can obtain are 2n types. Hence, feature points distinguishable from one another, of which maximum number is expressed by Expression 1, can be made:

$$_{2^n}P_4.$$ [Expression 1]

For example, if a number n of channel is four, $_{16}P_4=43680$ feature points can be made at the maximum. While at least 16 test pattern images are required to make 43680 feature points by using the gray code patterns, a number of test pattern images for use in this exemplary embodiment is four. As described above, the number of channels which express the colors of regions R is increased, whereby it becomes possible to make far more feature points.

Other Exemplary Embodiments

Figure 9:
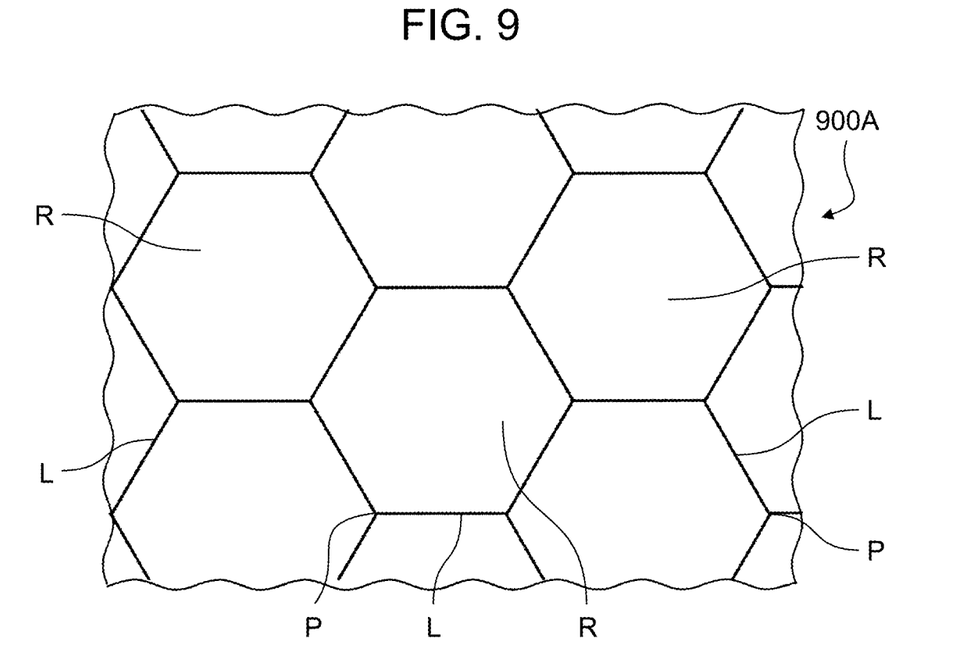
FIG. 9 is a view illustrating an example of region division in which a number of point-adjacent regions R is three in projection test pattern 900A in a projection image adjustment system according to a first modified example.

Other exemplary embodiments will be described with reference to FIGS. 9 to 12. FIGS. 9 to 12 are views illustrating examples of region division in projection test patterns 900A to 900D. FIGS. 9 to 12 partially illustrate projection test patterns 900A to 900D, respectively. In the first and second exemplary embodiments, the description is given of the case where projection test patterns 500, 800 are divided such that the number of regions R point-adjacent to one another at each feature point P is four. However, as illustrated in FIG. 9, if projection test pattern 900A is divided into hexagonal regions R, then projection test pattern 900A can also be divided such that the number of regions R point-adjacent to one another at each feature point P is three.

Figure 10:
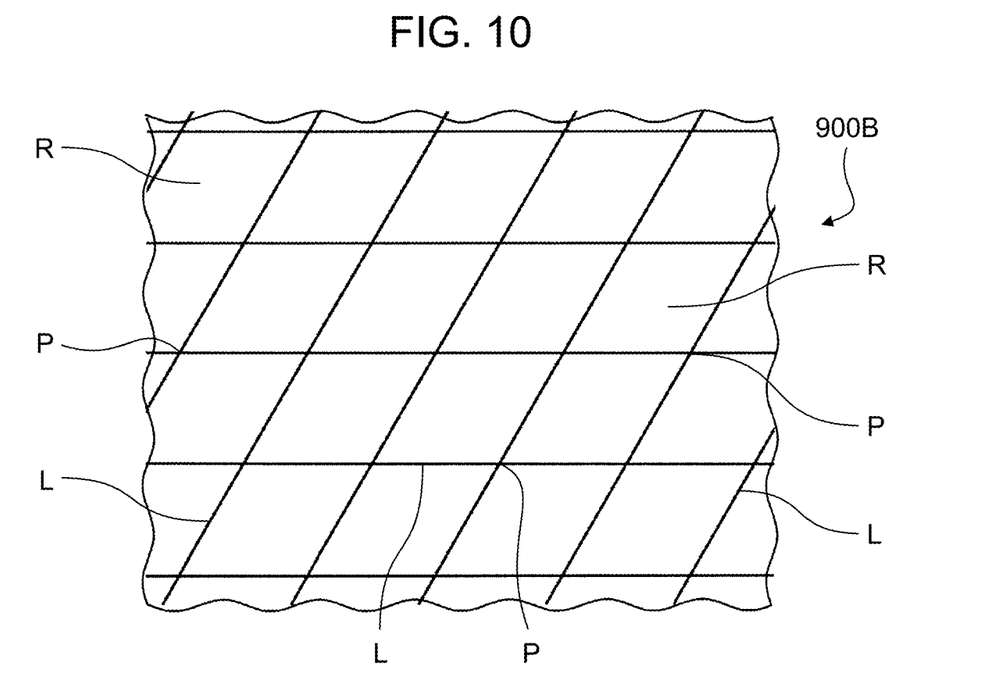
FIG. 10 is a view illustrating an example of region division in which the number of point-adjacent regions R is four in projection test pattern 900B in a projection image adjustment system according to a second modified example.
Figure 11:
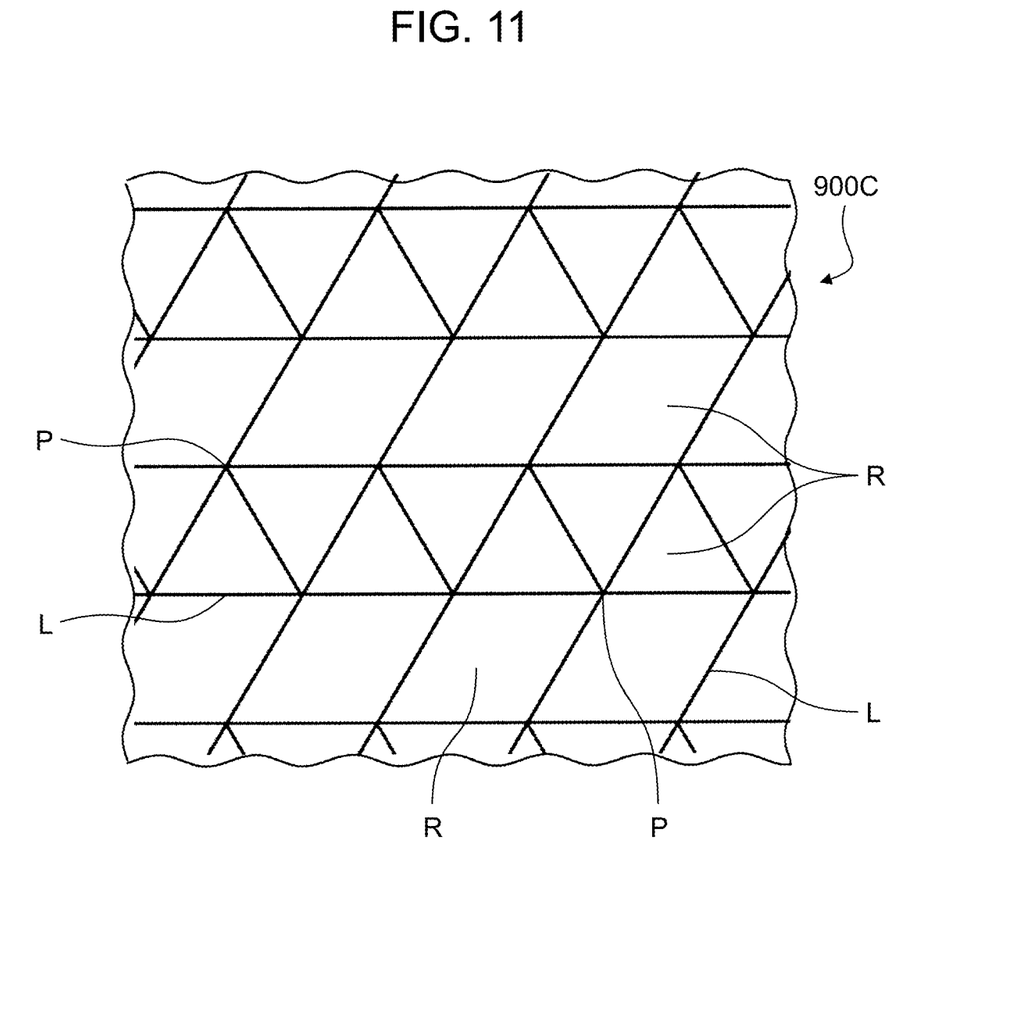
FIG. 11 is a view illustrating an example of region division in which the number of point-adjacent regions R is five in projection test pattern 900C in a projection image adjustment system according to a third modified example.
Figure 12:
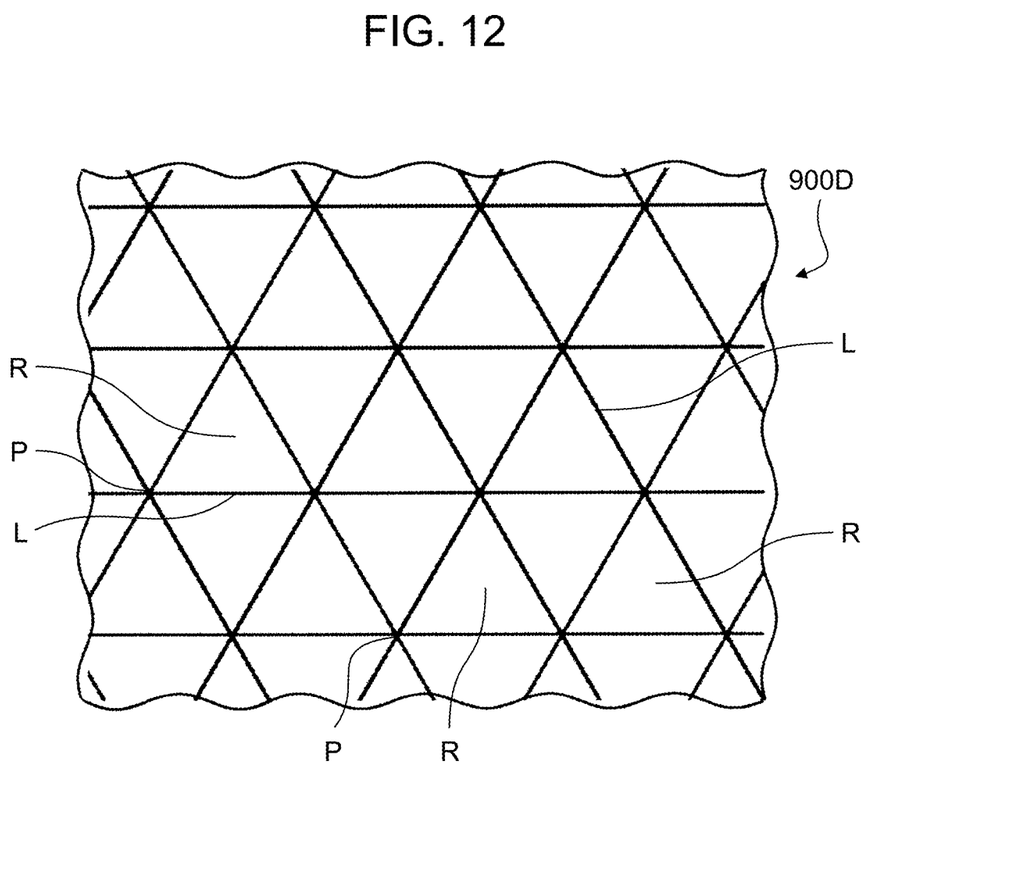
FIG. 12 is a view illustrating an example of region division in which the number of point-adjacent regions R is six in projection test pattern 900D in a projection image adjustment system according to a fourth modified example.

Likewise, in FIG. 10, projection test pattern 900B is divided into rhombic regions R, whereby the number of regions R point-adjacent to one another at each feature point P is set to four. In FIG. 11, projection test pattern 900C is divided into rhombic and triangular regions R, whereby the number of regions R point-adjacent to one another at each feature point P is set to five. In FIG. 12, projection test pattern 900D is divided into triangular regions R, whereby the number of regions R point-adjacent to one another at each feature point P is set to six. As described above, the number of regions R point-adjacent to one another at each feature point P in the projection test pattern is not limited to four, and may be an arbitrary number that is three or more. Note that the number of regions R point-adjacent to one another at each feature point P does not need to be the same as those at other feature points P.

In the first exemplary embodiment, eight types of colors at the maximum, which are obtained by three channels of R, G and B, are mentioned as the attributes which regions R of projection test pattern 500 have. Moreover, in the second exemplary embodiment, regions R are distinguished from one another by using $2^n$ types of colors at the maximum, which are obtained by n pieces of channels, as the attributes. However, the present disclosure is not limited to this, and for example, brightness may be used as the attributes (second attributes). For example, for the first exemplary embodiment, if respective digits of values (000 to 111) obtained by displaying, in a binary number, brightness values (0 to 7) of projection test pattern 500 having brightness gradation of eight stages are used as brightness channels (examples of the first attributes), then a similar effect is obtained That is, each of bits when the brightness value is expressed in the binary number is used as a brightness channel.

Moreover, in each of the first and second exemplary embodiments, four regions R point-adjacent to one another at one feature point P have colors different from one another. However, as long as two regions R side-adjacent to each other have colors different from each other, the same color may be used a plurality of times in four regions R point-adjacent to one another. For example, such feature point P can be made, at which four regions R sequentially having colors of white, green, white, and blue are point-adjacent to one another. Thus, a larger number of the feature points can be made of the same number of colors.

The present disclosure is widely applicable as a technique for correcting the distortion of the projection image of the projection display apparatus. For example, the present disclosure is applicable to such a technique as projection mapping of projecting a video onto a curved surface.

What is claimed is:

1. A projection image adjustment system comprising:
   a pattern generator configured to decompose a projection test pattern into a plurality of binary test patterns individually corresponding to a plurality of first attributes to be expressed in a binary manner;
   a projection display apparatus configured to individually project a projection image and the plurality of binary test patterns;
   a pattern combining unit configured to generate a plurality of binary captured images by individually binarizing a plurality of captured images generated by individually capturing the plurality of projected binary test patterns and combine the plurality of binary captured images into a combined captured image; and
   a calculator configured to transform the projection image by using a relationship between positions of a plurality of feature points in the combined captured image and positions of the plurality of feature points in the projection test pattern,
   wherein the projection test pattern includes a plurality of divided regions,
   wherein each of the plurality of regions includes a second attribute to be expressed by a combination of the plurality of first attributes, and
   wherein each of the plurality of feature points is a point shared three or more adjacent regions among the plurality of regions.

2. The projection image adjustment system according to claim 1,
   wherein the plurality of first attributes are a plurality of color channels to be expressed in values indicating ON or OFF, and
   wherein the second attribute is a color to be expressed by a combination of the values of the plurality of color channels.

3. The projection image adjustment system according to claim 2, wherein the plurality of color channels are three color channels corresponding to red, green, and blue.

4. The projection image adjustment system according to claim 1,
   wherein the plurality of first attributes are a plurality of brightness channels respectively indicating bits in which a brightness value is expressed in the binary number, and
   wherein the second attribute is a brightness to be expressed by a combination of the values of the plurality of brightness channels.

5. The projection image adjustment system according to claim 1, wherein, in the plurality of regions, a number of regions point-adjacent to one another at each of the plurality of feature points is same among all of the plurality of feature points.

6. A projection image adjustment method comprising:
   decomposing a projection test pattern into a plurality of binary test patterns individually corresponding to a plurality of first attributes to be expressed in a binary manner;
   individually projecting a projection image and the plurality of binary test patterns;
   generating a plurality of binary captured images by individually binarizing a plurality of captured images generated by individually capturing the plurality of projected binary test patterns and combining the plurality of binary captured images into a combined captured image; and
   transforming the projection image by using a relationship between positions of a plurality of feature points in the combined captured image and positions of the plurality of feature points in the projection test pattern,
   wherein the projection test pattern includes a plurality of divided regions,
   wherein each of the plurality of regions includes a second attribute to be expressed by a combination of the plurality of first attributes, and
   wherein each of the plurality of feature points is a point shared by three or more adjacent regions among of the plurality of regions.

* * * * *